United States Patent Office 2,802,036
Patented Aug. 6, 1957

2,802,036

DI-ALPHA-CUMYL PEROXIDE PRODUCTION

William D. Griffin, Convent Station, N. J., assignor to Allied Chemical & Dye Corporation, New York, N. Y., a corporation of New York No Drawing. Application January 12, 1954,
Serial No. 403,659

3 Claims. (Cl. 260—610)

This invention relates to production of di-alpha-cumyl peroxide of structural formula $(C_6H_5(CH_3)_2CO—)_2$, by direct oxidation of cumene in liquid phase with elemental oxygen, especially oxygen of air. For convenience this compound is referred to at times hereinafter simply as "cumyl peroxide."

Cumyl peroxide cannot be prepared by methods ordinarily used for preparation of tertiary aliphatic peroxides. Available methods involve decomposition of cumene hydroperoxide under carefully controlled conditions with consumption of added organic materials.

I have now discovered conditions for oxidizing cumene in liquid phase with a gas, containing elemental oxygen, whereby di-alpha-cumyl peroxide is the predominant product of oxidation. These conditions comprise presence of solid manganese dioxide in intimate contact with the cumene in amounts of at least about 0.1% by weight based on the weight of cumene in the reaction mixture, and reaction temperatures between about 80° and about 130° C. Optimum cumyl peroxide yields are obtained by employing concentrations of manganese dioxide catalyst in the range 0.1–5% by weight based on the cumene, the lower concentrations being used with higher reaction temperatures in the range 80°–130° C. and vice versa.

A particular advantage of my process is that it operates effectively with oxygen in the form of air at atmospheric pressure as the oxidizing agent. More elevated total pressures and/or more concentrated forms of oxygen can be used if desired, the resulting higher oxygen partial pressures tending to increase the oxidation rates. Inasmuch as these expendients permit use of smaller volumes of oxidizing gas than required for like oxidation using air at atmospheric pressure, these expedients proportionately reduce the amount of unoxidized cumene stripped from the reaction mixture by the oxidizing gas. For optimum results at increasing oxygen partial pressures, in general progressive changes in the ratio of catalyst concentration to temperatures are required.

Suitably oxidation in accordance with my invention is continued until at least about 20% by weight of the oxidation reaction mixture is cumyl peroxide. The maximum extent of oxidation consonant with good cumyl peroxide yields is to some extent a function of temperature, so that in order to avoid by-product formation it is advisable to stop the oxidation with more unoxidized cumene present, the higher the reaction temperature. At about 90°–110° C. good results are obtained upon withdrawing oxidation product containing between about 50% and about 30% by weight of unoxidized cumene with manganese dioxide amounting to about 0.5–1% by weight.

The manganese dioxide should be intimately contacted with the oxidation reaction mixture, e. g. by agitation maintaining the manganese dioxide suspended as a powder in the oxidation reaction mixture. The agitation is suitably provided by the stream of oxidizing gas bubbling through the reaction mixture and this can be supplemented if desired by mechanical agitation.

*Example.*—Two 250 milliliter three-neck "Pyrex" heat and chemical resistant glass conical flasks were suspended in an oil bath maintained at approximately 92° C. Each flask was provided with a thermometer and with a cold water condenser, with a water trap inserted between the reactor and condenser. Into each reactor was put 86 grams of commercial cumene shown by its ready oxidizability to be free of oxidation inhibitors; manganese dioxide was also added, 1.0 gram being put into one flask and 0.5 gram into the other. Air was bubbled into each flask at a rate of 10 liters per hour, through a glass tube of narrow tip diameter, the tip being very close to the bottom of the flask; dispersion of the catalyst was thus maintained by the incoming air. The temperature of the oil bath was varied slightly as required so as to maintain a temperature of 90° C. in the oxidizing cumene.

Heat and air flow were terminated after a total of 90.5 hours. Iodometric analyses of each product showed the presence of less than 1 percent cumene hydroperoxide in each. The two products were filtered and combined, and 110.25 grams of the mixture was fractionated under vacuum. Distillation data, plus infrared spectroanalyses of the various cuts, showed the following composition:

| | Percent |
|---|---|
| 15.2 grams acetophenone | 13.8 |
| 32.3 grams cumene | 29.3 |
| 2.5 grams alpha-methyl styrene | 2.3 |
| 2.0 grams phenol | 1.8 |
| 7.3 grams dimethyl phenyl carbinol | 6.6 |
| 0.3 gram water | 0.3 |
| 48.9 grams cumyl peroxide | 44.4 |

About 20 cc. of distillation residue (8% acetophenone, 92% cumyl peroxide) was diluted with 20 cc. of 95% ethanol, and chilled in a Dry Ice-isopropyl alcohol bath; a bright orange slush formed. This slush was filtered off, dissolved in ethanol, and reprecipitated by cooling; and this cycle was repeated until the filtered crystals were white and the wash ethanol essentially colorless. These crystals melted at 39° to 40° C.; this is the melting point given in the literature for di-alpha-cumyl peroxide.

The above example is illustrative of my invention, but it is not intended to limit the same to the details of the example.

I claim:

1. Process for production of predominately di-alpha-cumyl peroxide by oxidation of cumene in liquid phase with elemental oxygen, which consists essentially in contacting a gas, containing elemental oxygen, with cumene in liquid phase at temperatures in the range between about 80° and about 130° C., while maintaining in intimate contact with said cumene solid manganese dioxide in quantities of at least about 0.1% by weight based on the cumene in the reaction mixture.

2. Process as defined in claim 1 wherein the oxidizing gas is air at about atmospheric pressure.

3. Process as defined in claim 2, wherein reaction temperatures are in the range between about 90° C. and about 110° C. and oxidation product is withdrawn containing between about 50% and about 30% by weight of unoxidized cumene with manganese dioxide amounting to about 0.5–1% by weight.

References Cited in the file of this patent

UNITED STATES PATENTS

| 2,632,026 | Conner | Mar. 17, 1953 |
| 2,664,447 | Lorand et al. | Dec. 29, 1953 |
| 2,664,448 | Lorand et al. | Dec. 29, 1953 |